United States Patent [19]
Celeste et al.

[11] Patent Number: 5,958,619
[45] Date of Patent: Sep. 28, 1999

[54] TAPE CELL BATTERY SYSTEM

[76] Inventors: Salvatore A. Celeste, 24 Elmwood Cir., Peabody, Mass. 01960; Guy A. Rossi, 218 Exeter Rd., Hampton, N.H. 03842

[21] Appl. No.: 08/908,287

[22] Filed: Aug. 7, 1997

Related U.S. Application Data

[63] Continuation of application No. 08/599,461, Jan. 22, 1996, abandoned, and a continuation-in-part of application No. 08/231,744, Apr. 25, 1994, Pat. No. 5,536,592.

[51] Int. Cl.[6] .................................................... H01M 4/70
[52] U.S. Cl. .............................. 429/127; 429/129; 429/68
[58] Field of Search ....................................... 429/129, 127

[56] References Cited

U.S. PATENT DOCUMENTS

| | | | |
|---|---|---|---|
| 3,260,620 | 7/1966 | Gruber | 429/127 |
| 3,379,574 | 4/1968 | Grulke et al. | 429/127 X |
| 3,454,430 | 7/1969 | Gruber | 429/127 X |
| 3,494,796 | 2/1970 | Grulke et al. | 429/127 |
| 3,508,694 | 4/1970 | Gruber | 429/127 X |
| 3,607,401 | 9/1971 | Halpert et al. | 429/127 X |
| 4,010,308 | 3/1977 | Wiezer | 429/127 X |

*Primary Examiner*—Maria Nuzzolillo
*Assistant Examiner*—Mark Ruthkosky
*Attorney, Agent, or Firm*—E. Liebenstein

[57] ABSTRACT

The tape cell battery system comprises an elongated strip of flexible tape divided into segmented sections of anode, cathode and fluid electrolyte. The electrolyte is stored in a separated segment sealed from the segment containing the anode and cathode. The tape is advanced through nip rolls to individually break open each sealed segment containing electrolyte such that the electrolyte is caused to flow into a single adjacent segment containing said anode and cathode such that only one battery cell at a time becomes electrochemically active while the other battery cells remain electrochemically dormant.

17 Claims, 18 Drawing Sheets

TAPE CELL BATTERY SYSTEM

FIELD OF THE INVENTION

This application is a continuation of Ser. No. 08/599,461 filed Jan. 22, 1996, which is abandoned and is a continuation in part of U.S. patent application Ser. No. 08/231,744, filed: Apr. 25, 1994, now U.S. Pat. No. 5,536,592 and relates to the construction of a galvanic battery in which the anode and/or cathode and/or electrolyte, individually or collectively are supplied from an elongated strip of tape arranged in segmented sections to provide discrete periods of battery operation separated by controlled periods of dormancy with the period of controlled dormancy between the activation of each of the segmented cell sections of the battery tape under the control of the operator.

BACKGROUND OF THE INVENTION

Battery systems using a thin flexible tape of electrode material have been suggested in the prior art as a means for supplementing or replenishing the supply of the anode electrode to prolong the life of the battery. An example of a system employing an elongated tape of anode material fed from a supply reel to a take up reel is disclosed in U.S. Pat. No. 4,916,036. The anode described in this patent is supplied from an elongated tape composed of a reactive metal such as lithium wound on a reel and fed from a first chamber through a second reaction chamber containing a solution of electrolyte and cathode to a third chamber in which the tape is wound on a take up reel. The take up reel is driven by a motor under the control of a controller to advance the tape, preferably continuously, through the bath of electrolyte. A continuous fresh supply of anode material is intended to prolong the operation of the battery. Another battery system using a strip of tape containing segments of individual battery cells is taught in U.S. Pat. No. 3,494,796. In this patent each battery cell is composed of its own anode and cathode separated by a layer impregnated with electrolyte. The tape is advanced so that an external pair of collector plate's makes contact with each cell in succession. Thus only one cell at a time is connected to the terminals for heavy discharge while the other cells are held in reserve and discharge at a low level. U.S. Pat. No. 3,577,281 is yet another prior art teaching using an elongated tape coated with an anode material which is driven into a solution of electrolyte.

The commonality between these galvanic battery systems is the use of a tape or strip of anode material fed from a reel primarily to supplement the availability of anode material. This is intended to provide a high energy density to weight ratio and to yield higher battery efficiency using a minimum amount of space. The storage life of the battery and its discharge capacity in all such prior art arrangements is fixed although the battery may be discharged at a variable rate over selected intervals of time according to usage.

The galvanic battery cell of the present invention is constructed to provide operator control over the introduction and/or replenishment of segmented sections containing the electrodes and/or electrolyte or alternatively to provide, when necessary, a supplemental supply of anode material to extend the storage life of the battery for an extended period. This is accomplished by using an elongated tape having segmented sections of electrode and/or electrolyte material to provide discrete periods of operation with indefinite periods of dormancy during which the battery remains inactive. In one embodiment of the invention battery operation is initiated by controlling the introduction of the anode to an electrolyte compartment of the battery by means of a strip of inactive material connected to the elongated tape in the form of a leader. The leader permits the tape containing the sections of anode material to be introduced into the electrolyte under the control of the operator. Accordingly, the battery does not begin to discharge until the battery is actually placed in use which substantially increases the storage life of the battery. In this embodiment of the invention the leader performs the dual function of initiating battery operation and separating the spent anode tape electrode from the fresh anode tape.

The battery of the present invention provides for a period of controlled dormancy between the activation of each of the segmented sections of the battery thereby extending battery operation for an indefinite time period under the control of the operator.

Moreover in accordance with the preferred embodiment of the present invention the housing of the battery is constructed with only one compartment which acts as both an "electrochemically active" and an "electrochemically inactive" compartment or uses two compartments one of which is "electrochemically active" and the other of which is "electrochemically inactive". The electrochemical reaction between the anode, cathode and electrolyte occurs in one segmented section of the battery representing the "electrochemically active" compartment. If a separate "electrochemically inactive" compartment is used it should preferably contain a supply of anode material on an elongated strip of tape which is fed to the electrochemically active compartment to operate the battery. The elongated strip of tape is preferably interconnected to form an endless loop. The tape also contains a strip of inactive material arranged within the endless loop to function as a leader for the tape to control activation of the battery at the outset of battery operation. Unused or spent tape cells of anode material are rewound on a common spool with the tape of fresh anode material using the leader of inactive material to separate the fresh anode material from the spent anode or using the housing of each segmented section to isolate each section from one another. This simplified construction permits the battery configuration of the present invention to be light in weight and to exhibit a higher performance efficiency and a higher energy density to weight ratio relative to any known prior art battery construction of comparable size and capacity.

SUMMARY OF THE INVENTION

In one embodiment of the present invention the tape cell battery system comprises an elongated strip of flexible tape composed of a plurality of discrete sections with each section of tape including an anode, a cathode, a fluid electrolyte and a sealed compartment for storing said electrolyte isolated from said anode and said cathode and with said system further comprising means for opening the sealed compartment in each section to cause such section to become electrochemically active while the other sections remain electrochemically dormant.

In another embodiment of the present invention the tape cell battery system of the present invention comprises a single compartment housing an elongated strip of flexible tape interconnected as an endless loop, means for separating said tape into segmented sections containing an anode, a cathode and fluid electrolyte and means for forming a weak seal of predefined strength between each segment containing said fluid electrolyte and an adjacent segment containing an anode and cathode so as to form a plurality of electrochemically dormant battery cells and means for individually opening each weak seal in each battery cell such that only one battery cell at a time becomes electrochemically active while the other battery cells remain electrochemically dormant.

BRIEF DESCRIPTION OF THE DRAWINGS

Other objects and advantages of the present invention will become apparent from the following detailed description of the invention when read in conjunction with the accompanying drawings of which.

DETAILED DESCRIPTION OF THE INVENTION

Figure 1:
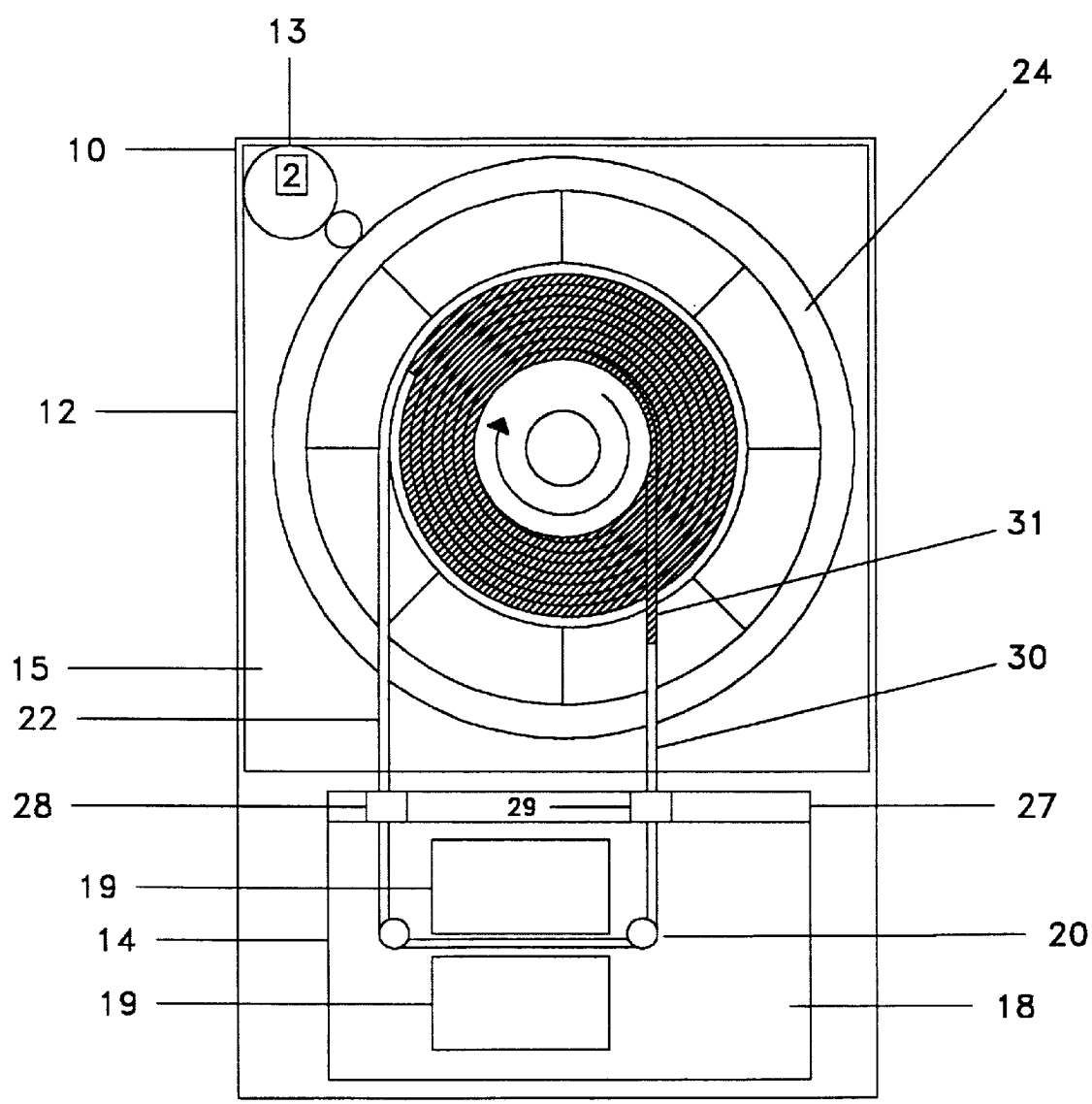
FIG. 1 is a schematic of one embodiment of the battery tape system of the present invention.

The battery 10 as shown in FIG. 1 is constructed with a common housing 12 containing a single electrochemically active compartment 14 and a single electrochemically inactive compartment 15. The electrochemically active compartment 14 contains a liquid source of electrolyte 18, preferably aqueous, a cathode 19 and a plurality of rollers 20 about which an elongated strip of flexible tape 22 is threaded for selective advancement from the electrochemically inactive compartment 15 through the electrochemically active electrolyte compartment 14. The strip of flexible tape 22 contains a supply of anode material for the battery 10 and may also include a supply of electrolyte 18 and/or a supply of cathode. Alternatively, the cathode 19 may be located in the electrochemically active compartment 14 as a solid and/or particulate member or may be a stationary air permeable electrode (not shown).

The strip of flexible tape 22 is stored on a single rotatable supply and take up reel 24 located in the electrochemically inactive compartment 15 of the housing 12. In addition to the rotatable supply and take up reel 24 the electrochemically inactive compartment 15 contains a conventional counter 23 for measuring each revolution of the tape 22 as it is advanced through the electrochemically active compartment 14 and a mechanism 25, as diagrammatically illustrated in FIG. 7, for sequentially advancing the rotatable reel 24 under manual or electronic control of an operator. The mechanism 25 may be, for example, a simple mechanical rotary dial for manually rotating the reel 24 or any other mechanical mechanism such as a conventional ratchet mechanism (not shown). Alternatively an electronic motor control means (not shown) may be used for advancing the tape 22.

The electrochemically inactive anode compartment 15 is separated from the electrochemically active compartment 14 by a divider 27 and a pair of wipers 28 and 29 respectively. The wipers 28 and 29 function to wipe the tape 22 on ingress to the active electrolyte compartment 14 and on egress therefrom. The wipers 28 and 29 may be composed of any durable flexible material preferably an elastomeric material to provide a substantial degree of isolation between the two compartments 14 and 15 but not necessarily to seal the two compartments from one another. The primary function of the wipers 28 and 29 is to prevent excessive build up of electrolyte on the anode tape 22 and to wipe off electrolyte residue from the spent anode tape 22 withdrawn from the inactive anode compartment 15. Separation of the compartments 14 and 15 is more ideally accomplished in accordance with the present invention by the construction of the flexible tape 22 as will hereafter be explained in detail.

Figure 2:
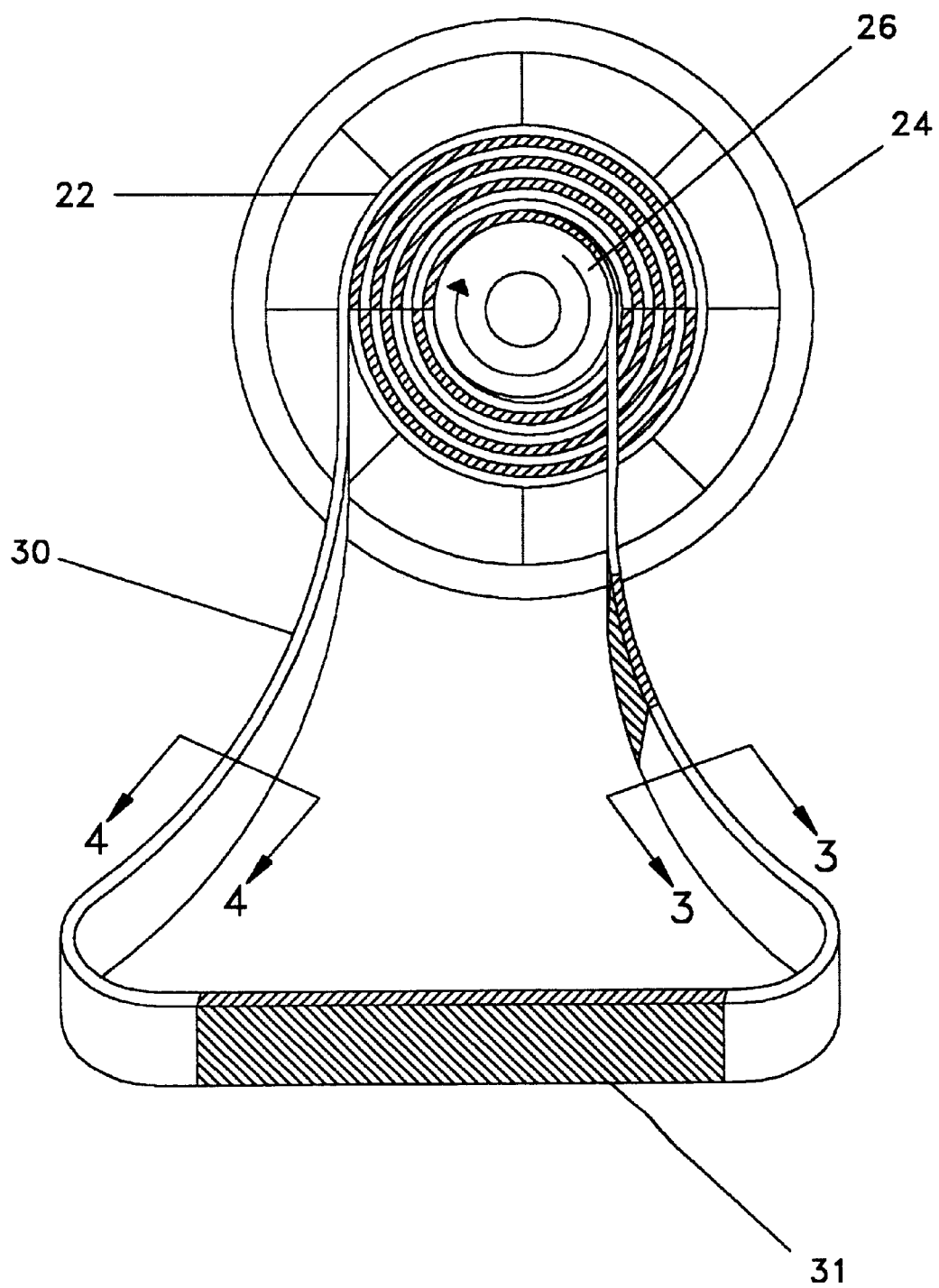
FIG. 2 is an enlarged perspective view of a reel assembly for the battery tape system of FIG. 1 showing a preferred winding arrangement for the flexible tape so that its inner winding is connected to its outer winding to form an endless loop with a leader for separating spent anode tape from active segmented anode tape.

The flexible tape 22 should preferably be interconnected to itself to form an endless loop as is shown in FIG. 2 with a strip of inactive material 30 of predetermined length in the endless loop serving as the leader for the tape 22. The flexible tape 22 is cylindrically wound around a core 26 of the supply reel 24 with the inner winding thereof extending outwardly from the core 26 and looped back to form the outer winding of the endless loop of tape 22. The core 26 is advanced mechanically or electrically as earlier explained until the strip of inactive material 30 is part of the tape 22 which extends outwardly from the core 26. The extended portion of tape 22 is threaded through the set of wipers 29 into the active electrolyte compartment 14 and around the idler rollers 20 where it is then passed through the second set of wipers 28 back to the supply reel 24. Any material which will not react in the electrolyte compartment 14 may be used as the strip of inactive material 30 including a composition of plastic, composite or ceramic. The strip 30 serves a dual function both as a leader for the tape 22 to activate the battery 10 under the control of the operator and for separating fresh anode tape 22 fed from the anode compartment 1 5 from the spent anode tape 22 returned to the supply reel 24. The battery 10 will remain dormant until the strip of inactive material 30 is passed out of the active compartment 14 and a section of the tape 22 containing a section of anode material is fed into the active compartment. To accomplish this when using a single reel 24 both as a supply reel and a take up reel it is necessary to employ a minimum length of tape 22. The minimum length of tape 22 necessary to separate the unused fresh anode material from the spent tape on the single reel 24 should equal πD where D represents the outer diameter of the cylindrical winding of flexible tape 22.

Figure 3:
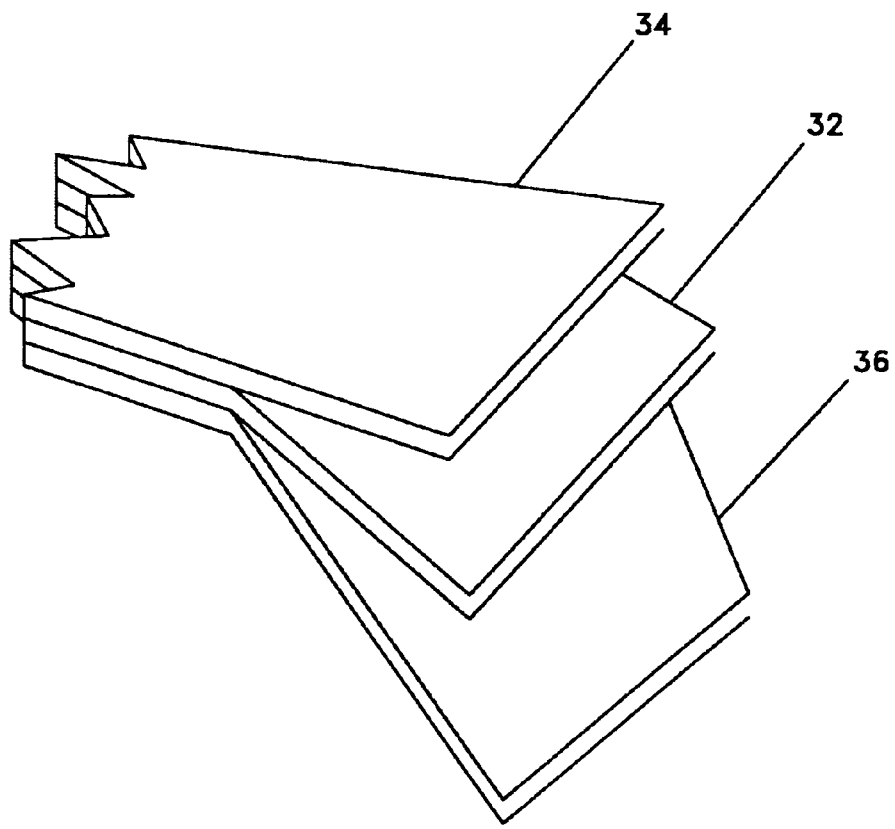
FIG. 3 is a diagrammatic perspective view of a section "L" of the flexible tape taken along the lines 3—3 of FIG. 2 showing the flexible tape as a laminated composite.

The tape 22 may be composed of a layer of a porous or non-porous substrate material 32 as shown in FIG. 3 with a superimposed anode layer 34 of any desirable anode material such as zinc, aluminum, magnesium etc. as is well known to those skilled in the art. Accordingly, the anode can be a single metal or a metal alloy or combination thereof. A cathode layer 36 may, if desired, be superimposed on the opposite side of the substrate 32. The cathode layer 36, may likewise be of a single material such as manganese dioxide or a composite. Although the tape 22 may be formed as a laminated composite, as is shown in FIG. 3, the tape configuration is not limited to a laminated configuration. The layers may, for example, be coated on the substrate 32. In fact a braided or woven arrangement may be used for the anode and substrate as well as for the optional cathode layer 36. The cathode layer 36 is optional since a supply of cathode 19 may be directly incorporated into the active compartment 14 or may be a stationary air permeable electrode. The composition of the electrolyte will necessarily be selected based upon the selection of the anode and cathode as is well known to those skilled in the art.

The selected configuration for the tape 22 will determine the method of segmentation of anode sections to provide control over the period of electrochemical inactivity in the active electrolyte compartment 14 i.e. the duration of battery dormancy. Dormancy is controlled by the absence of a supply of anode material to the electrolyte compartment 14 or the absence of a supply of supplemental electrolyte.

Figure 4:
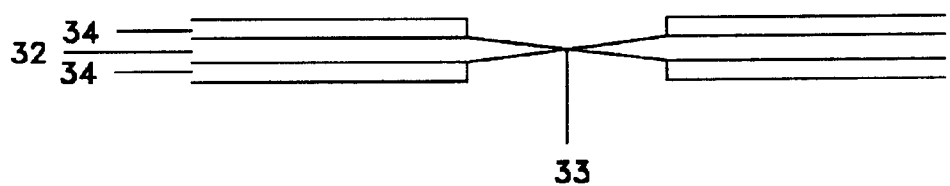
FIG. 4 is an alternate embodiment of the construction of the flexible tape shown in cross section.

FIG. 4 illustrates one configuration of the tape 22 in which the anode layer 34 is segmented into separate anode sections 34 spaced apart on the substrate 32 so that only one section 34 of anode material at a time may be introduced into the active compartment 15. This can be controlled by the mechanism 25 used to advance the tape 22 and is particularly suited to use of a mechanical ratchet mechanism 25 or an electronic type of advancement mechanism using a motor (not shown). Once one section 34 of anode material is consumed in the active compartment 14 the battery is rendered inactive or dormant until another section 34 of anode material is advanced into the active compartment 14.

Figure 5:
FIG. 5 is another embodiment of the flexible tape of the present invention shown in longitudinal cross section taken along the same direction as that of FIG. 4.
Figure 6:
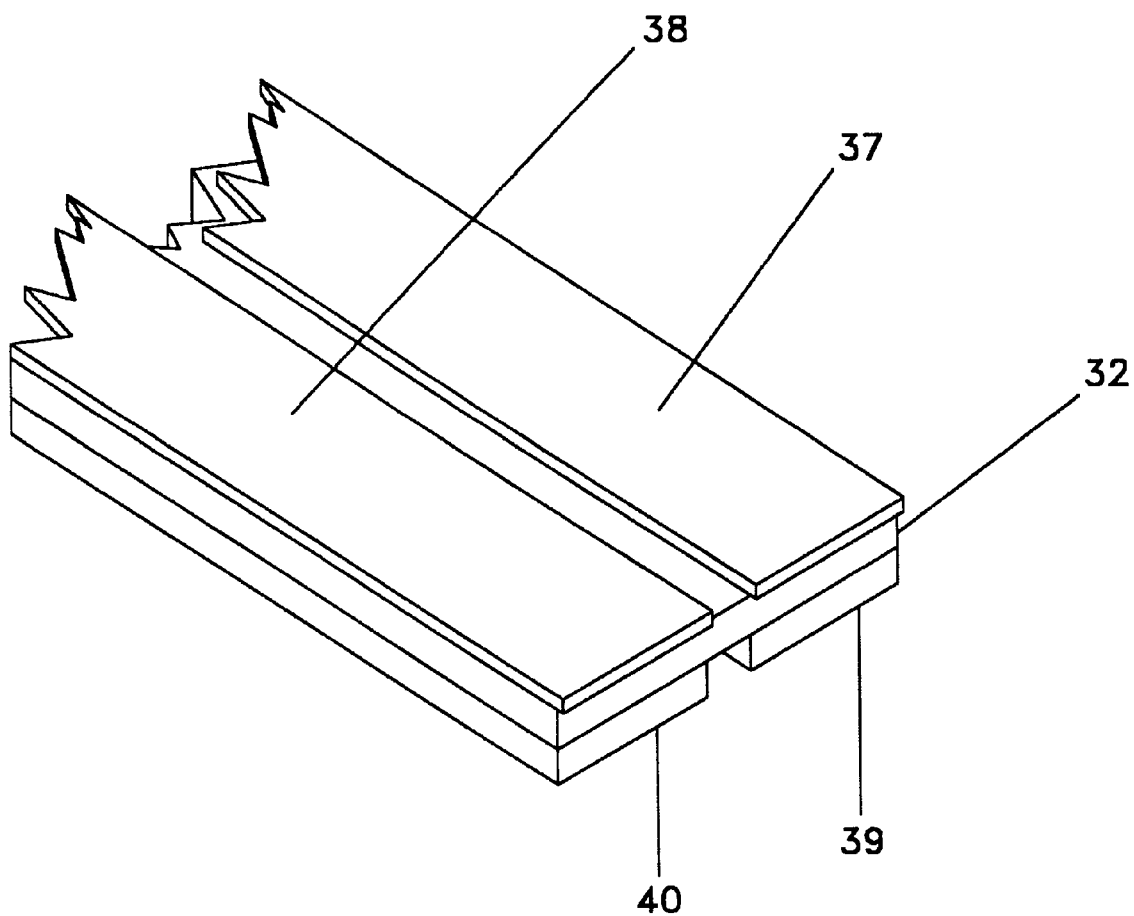
FIG. 6 is a perspective view of an even further embodiment of the construction of the flexible tape of the present invention showing several independent lengthwise strips of anode on a single substrate.

The substrate 32 may be composed of any material composition which will not be consumed in the electrochemically active compartment 14 such as, e.g., polyester, polypropylene or graphite. A porous substrate 32 is preferred so that supplemental electrolyte 18 may be stored in the substrate 32 and introduced into the active electrolyte compartment 14 as the tape 22 is advanced therethrough. Alternatively supplemental electrolyte 18 may be coated on the substrate as a separate layer. The supplemental electrolyte 18 should be dry or encapsulated so as not to be active outside of the compartment 14. To prevent absorption of electrolyte from the active electrolyte compartment 14 into the porous substrate 32 by capillary forces the substrate 32 can be reduced to a pinch point source at a location 33 between the electrode sections 34. Alternatively, wicking can be prevented by incorporating a wax or other organic material to form a fully densified area at the locations 33. An alternative configuration for tape 22 is shown in FIG. 5 in which the anode layer 34 is continuous but the substrate 32 is represented by segmented sections 32 separated by voids 35 or densified areas. A tape configuration using an arrangement of a plurality of continuous anode layers 37 and 38 laterally separated from one another on a single substrate 32 is shown in FIG. 6. Multiple cathode layers 39 and 40 may likewise be longitudinal arranged on the substrate 32.

Figure 7:
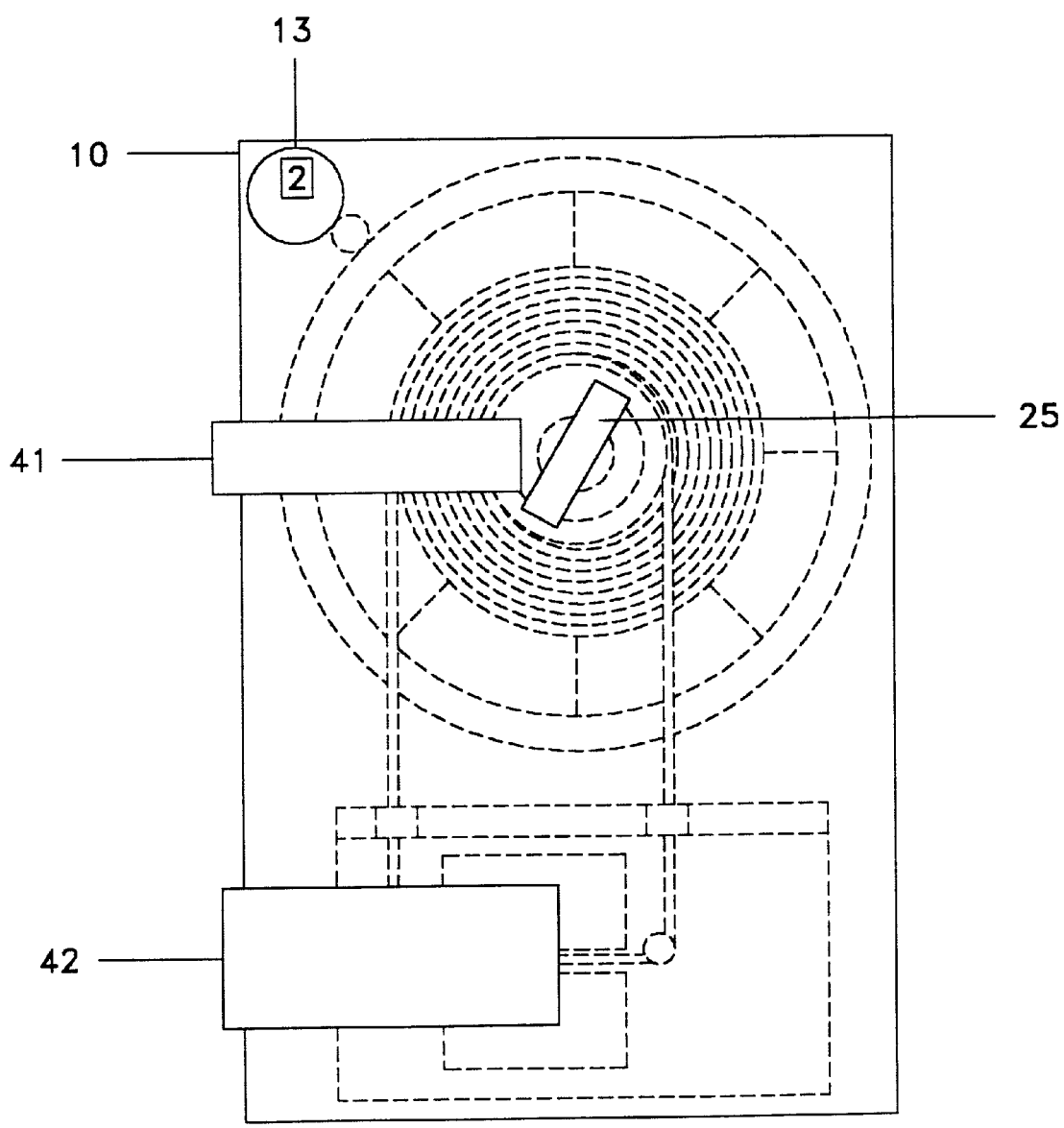
FIG. 7 is a diagrammatic view of the tape battery system of FIG. 1 showing terminal contact connections for the battery system and a mechanical connection for winding and unwinding the reel of FIG. 1.
Figure 8:
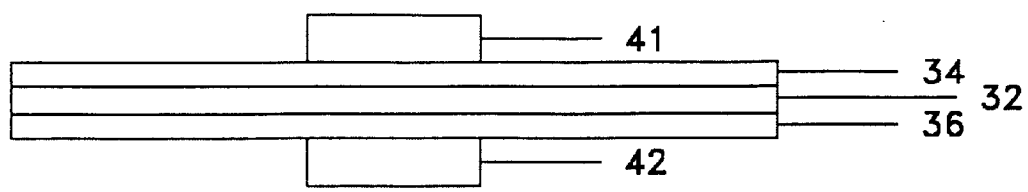
FIG. 8 shows one embodiment for connecting the flexible tape to contact terminal connections.
Figure 9:
FIG. 9 shows another arrangement for connecting the flexible tape to contact terminals when the tape does not include a cathode layer.
Figure 10:
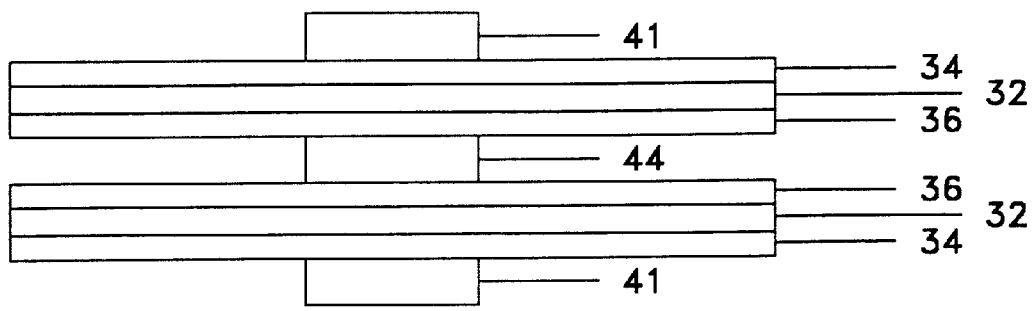
FIG. 10 shows an electrical arrangement for connecting the multiple anode strips of flexible tape in the embodiment of FIG. 6 to the terminals of the battery.

The battery 10 may include contact terminals 41 and 42 as shown in FIG. 7. An arrangement for connecting the contact terminals 41 and 42 to the anode layer 34 and cathode layer 36 is shown in FIG. 8. An alternative arrangement for connecting the contact terminals 41 and 42 to the anode layer 34 for use with no cathode layer 36 is shown in FIG. 9. In the latter case the contact terminal 42 would be directly connected to the cathode 19 in compartment 14. The multiple anode and cathode arrangement shown in FIG. 6 may be connected to the contact terminals 41 and 42 as shown in FIG. 10 using a common third terminal 44 serving as a normal or ground terminal to provide a parallel output which will permit multiple electrical contact points and multiple voltages from a single battery cell 10.

Figure 11A:
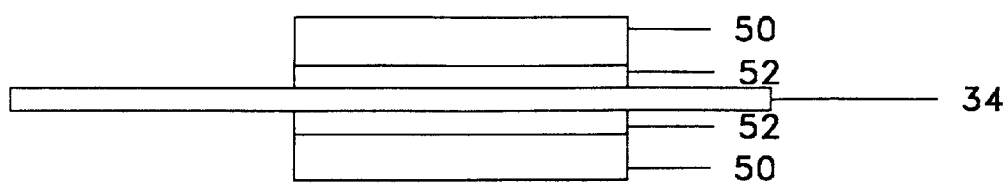
FIG. 11(a) is a diagrammatic view of an alternate embodiment of the electrochemically active compartment of the battery housing of FIG. 1 for a single anode layer tape arrangement.
Figure 11B:
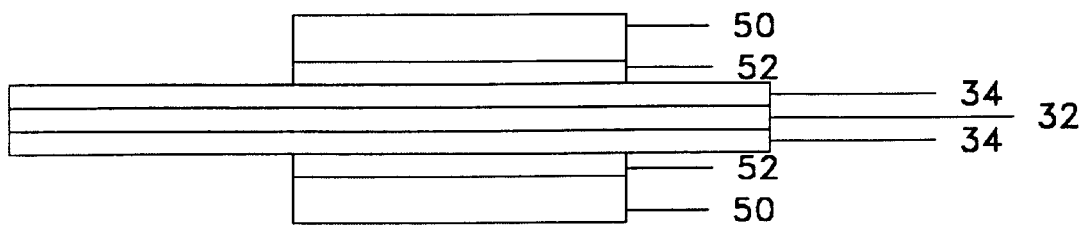
FIG. 11(b) is another diagrammatic view similar to FIG. 11(a) for a double anode layer arrangement.

The active electrolyte compartment 14 may include the source of electrolyte 18 and cathode 19 in one or a plurality of separate electrolyte chambers 50 containing a porous permeable or semi-permeable membrane 52 extending from the chamber 50 and arranged to contact the anode layer 34 on the tape 22 as shown in the embodiments of FIG. 11(a) and 11(b) respectively. The use of a semi-permeable membrane 52 provides maximum surface area exposure between the electrolyte and anode for an electrochemical reaction. FIG. 11(a) shows the semi-permeable membrane 52 connected to a single anode layer 34 whereas FIG. 11(b) shows a double anode layer arrangement. The electrolyte chamber 50 may also be used to provide supplemental electrolyte 18 into the active compartment 14 in the configuration of FIG. 1. In the latter arrangement the function of the membrane 52 is to permit ion transfer from a solution of higher concentration of electrolyte ions to migrate to a lower concentration. As an example assume the electrolyte solution contained 20 to 45% by weight aqueous potassium hydroxide "KOH". To replenish the solution with fresh ions of potassium and hydroxide the chamber 50 may contain a saturated solution of e.g. between 45 to 50% KOH thereby maintaining a constant supply of electrolyte to replenish the electrolyte solution as it is depleted during battery operation. The supplemental electrolyte may of course be otherwise provided from dry or encapsulated material impregnated on the tape 22 as explained earlier.

The operational sequence of the battery 10 involves winding the tape 22 on the reel 24 so that the strip of inactive material 30 is initially located in the active compartment 14 of the battery housing 12. In this position the battery 10 is dormant until the tape 22 is advanced under the control of an operator. The tape 22 is preferably advanced intermittently so that only one anode section 34 is physically present in the active compartment 14 at a time. When the material in one anode section 34 of the tape 22 is fully consumed the battery 10 is rendered dormant until the tape 22 is again advanced. Their is no time limit to the period of dormancy between advancing intervals unless the tape is advanced automatically by a controller (not shown).

Figure 12:
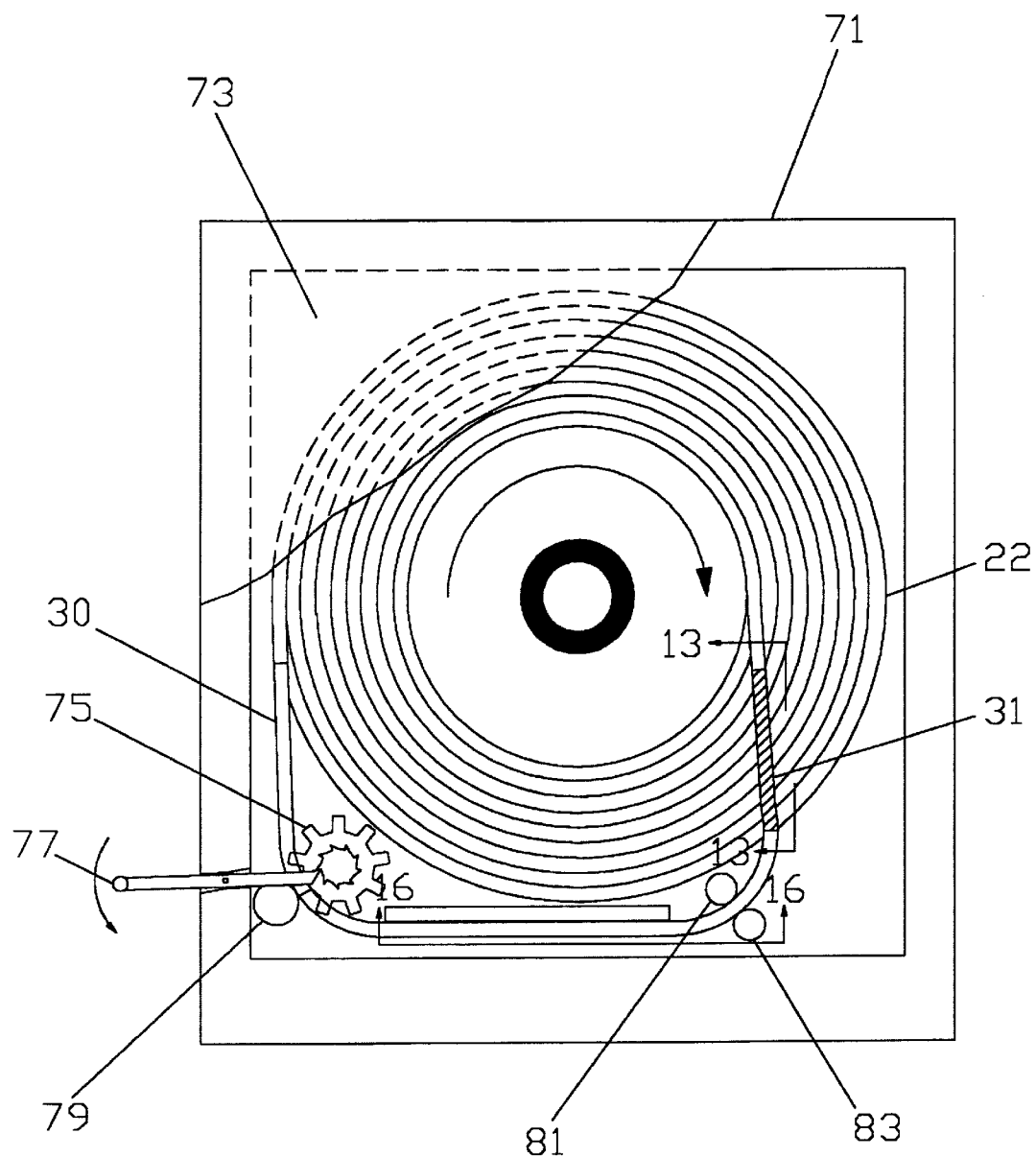
FIG. 12 shows a more preferred embodiment of the present invention.
Figure 13:
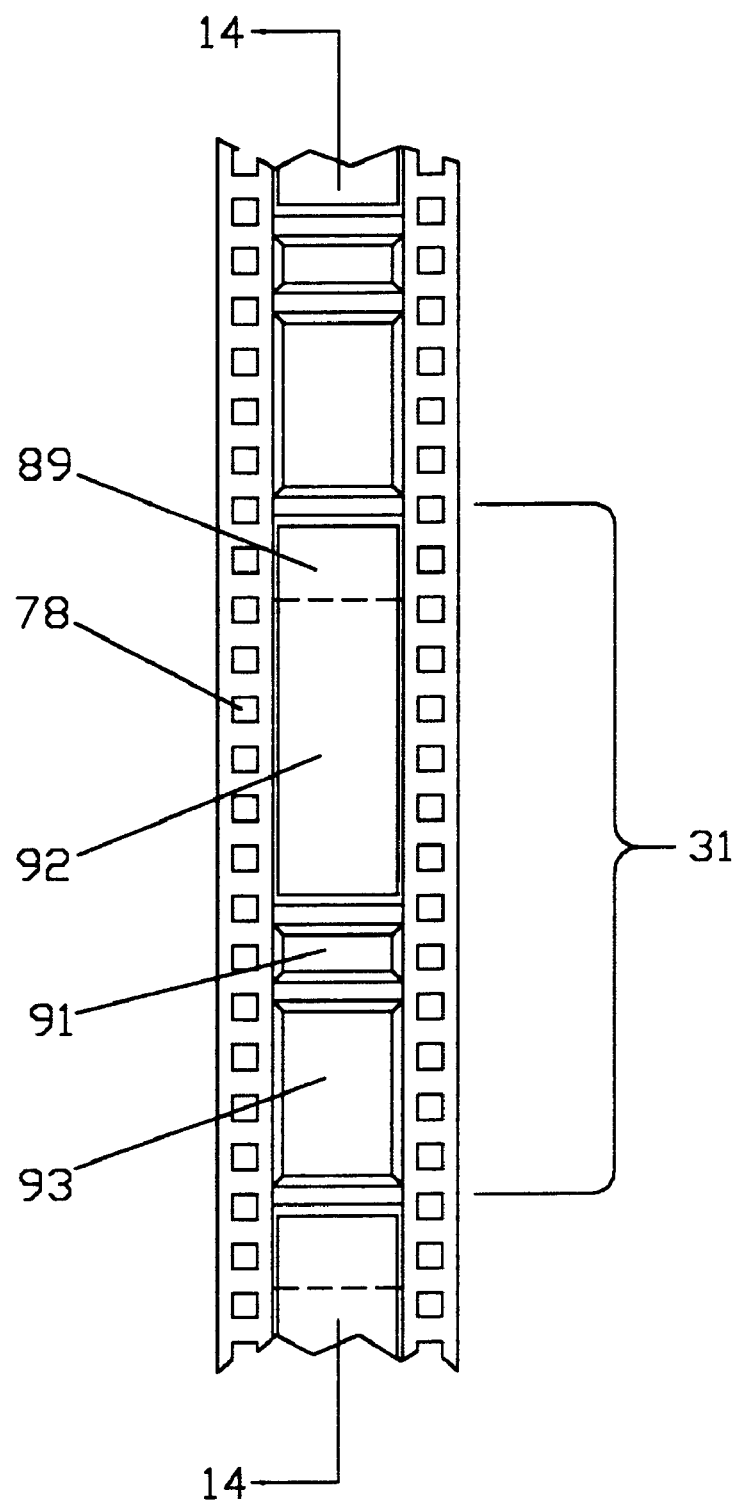
FIG. 13 is an enlarged view of a section of the tape of FIG. 12.

Another preferred embodiment of the present invention is shown in FIG. 12. In this embodiment the tape battery cell system of the present invention has only one compartment located in a housing 71 which functions as both the electrochemically active and the electrochemically inactive compartments of FIG. 1. A strip of flexible tape 22 is stored in the housing 71 preferably wound around a rotatable supply and take up reel 24 (shown symbolically) corresponding to the supply reel 24 of FIG. 1. The strip of flexible tape 22 is preferably interconnected to form a closed loop of tape in the manner described hereinbefore in connection with FIGS. 1 and 2. The tape 22 may have a designated starting end 30 representing a strip of inactive material which functions as a leader for the first section 31 of tape 22. The housing 71 also contains a cover 73 and may contain a conventional counter (not shown) for measuring each section of the tape 22 as it is sequentially advanced under manual or electronic control by an operator. The tape 22 is manually advanced by a rachet mechanism 75 having a manual lever arm 77. The lever arm 77 engages the sprocket holes 78 in the tape 22 as shown in FIG. 13. The sprocket holes 78 of the tape 22 are captured between the rachet mechanism 75 and an idler roll 79. In this manner the rachet mechanism 75 performs two functions one of which is to manually advance the tape 22 from the rotatable supply and take up reel 24 by a fixed length of tape corresponding to one tape section for each movement of the lever arm 77 and to redirect an equal length of tape back upon the reel 24. Each movement of the lever arm preferably advances the tape 22 one tape section at a time. After one battery cell of the tape is activated and is no longer operational the tape is advanced so that the used section of tape 22 is rewound onto the reel 24 over the inactivated sections of the tape 22 as explained in the embodiment of FIG. 2. In this way the one housing 71 contains each of the electrochemically active sections and the electrochemically inactive sections of the tape 22 at the same time. It should be understood that an electronic motor control means (not shown) may be used for automatically advancing the tape 22.

Figure 14:
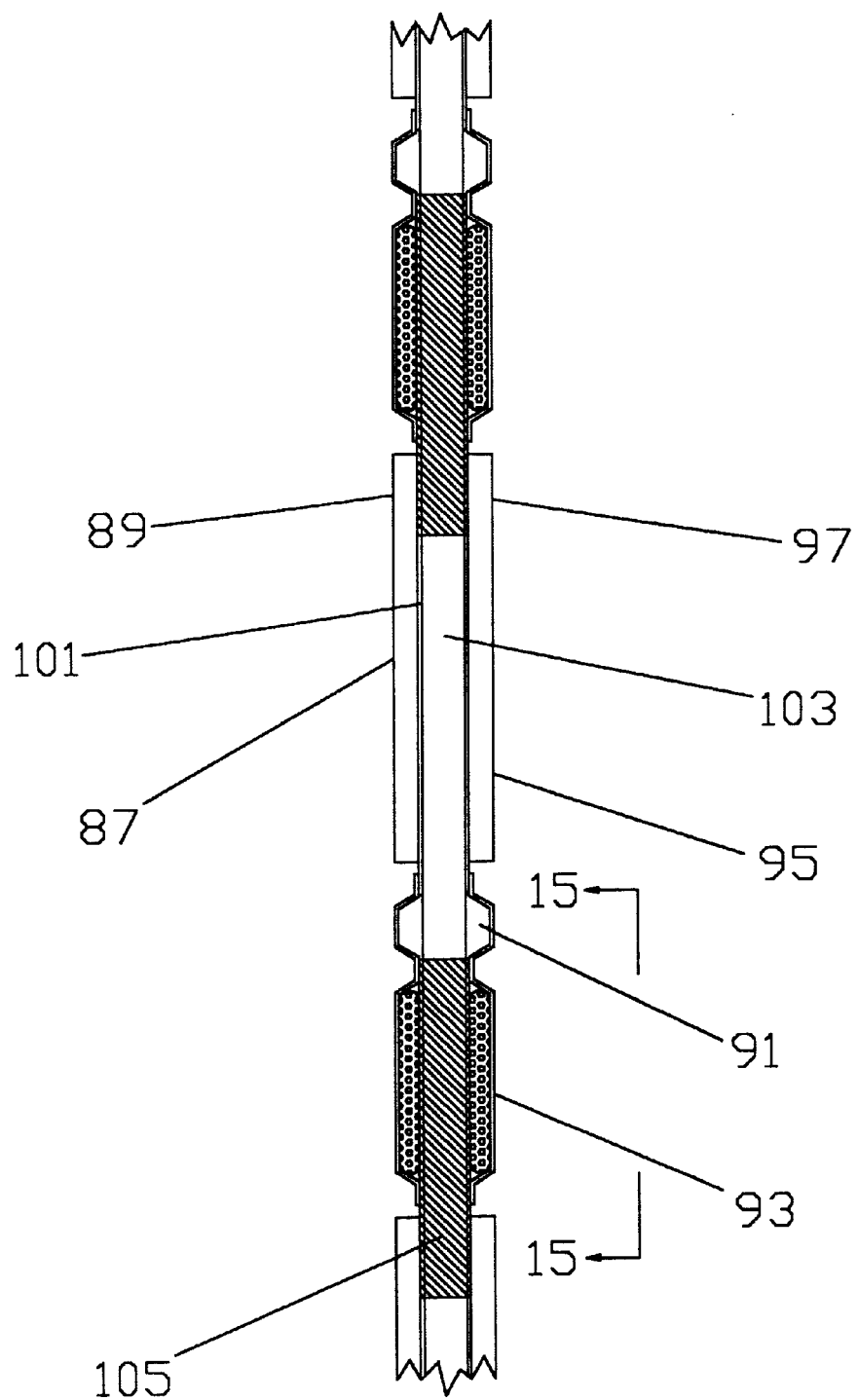
FIG. 14 is view in cross section taken along the lines 14—14 of FIG. 13.

The starting end 30 of the tape 22 is guided through nip rolls 81 and 83 which are separated by a fixed distance and/or are spring loaded (not shown) to maintain a predetermined force against both sides of the tape 22. As will be explained in more detail in connection with FIG. 13 the tape 22 is composed of a multiplicity of identical segmented tape sections 31 each of which defines a battery cell which is in a dormant electrochemically inactive state. The nip rolls 81 and 83 guide the tape 22 off the reel and electrochemically activate each tape section 31, one at a time, as the tape 22 passes between the nip rolls 81 and 83. The nip rolls 81 and 83 squeeze the tape until the sealed segment 93 containing fluid electrolyte is opened as will be explained in greater detail in connection with FIGS. 16A–16D respectively. The sealed segment 93 is preferably in the form of a reservoir blister sealed at a given end so that upon being opened the fluid electrolyte can flow in only one direction as will be explained in connection with FIGS. 16A–D respectively. The nip rolls 81 and 83 are preferably fabricated from electrically conductive material so that they may also function to provide electrical contact between the anode side 95 of the tape 22 and the cathode side 87 of the tape 22 as shown in FIG. 14.

Each section 31 of the tape 22 as is shown in FIG. 13 comprises a sealed segment 93 defining a reservoir blister for storing electrolyte, a segment 92 containing a cathode 87, an anode 95 and may include a separator film 101. In addition each section 31 should also preferably include at least one plenum 91 disposed between the electrolyte reservoir blister 93 and the electrode section 92. As shown in FIG. 14 the cathode 87 and anode 95 lie opposite one another with a porous absorbent material 103 disposed between them. The cathode 87 lies on one side of the tape preferably on the inside with the anode 95 preferably on the other or outside of the tape dependent upon how the tape 22 is being wound around the supply and take up reel 24. The orientation of the tape 22 is optional and will determine which of the nip rolls 81 and 83 provides the positive and negative contact for the activated tape cell. As is shown in FIG. 12 the lower nip roll 83 makes contact with an electrical contact area 89 on the cathode side 87 of the tape 22 and the upper nip roll 81 makes contact with an electrical contact area 97 on the anode side 95 of the tape 22.

The cathode 87 may be formed from any conventional cathode material such as manganese dioxide, copper chloride or may be represented by an air cathode or by an oxygen depolarizer cathode of e.g. silver chloride. The anode must of course be selected to be compatible with the selected cathode and may be of, any anodic material such as zinc, aluminum, magnesium, silver etc. as is well known to those skilled in the art.

Figure 15:
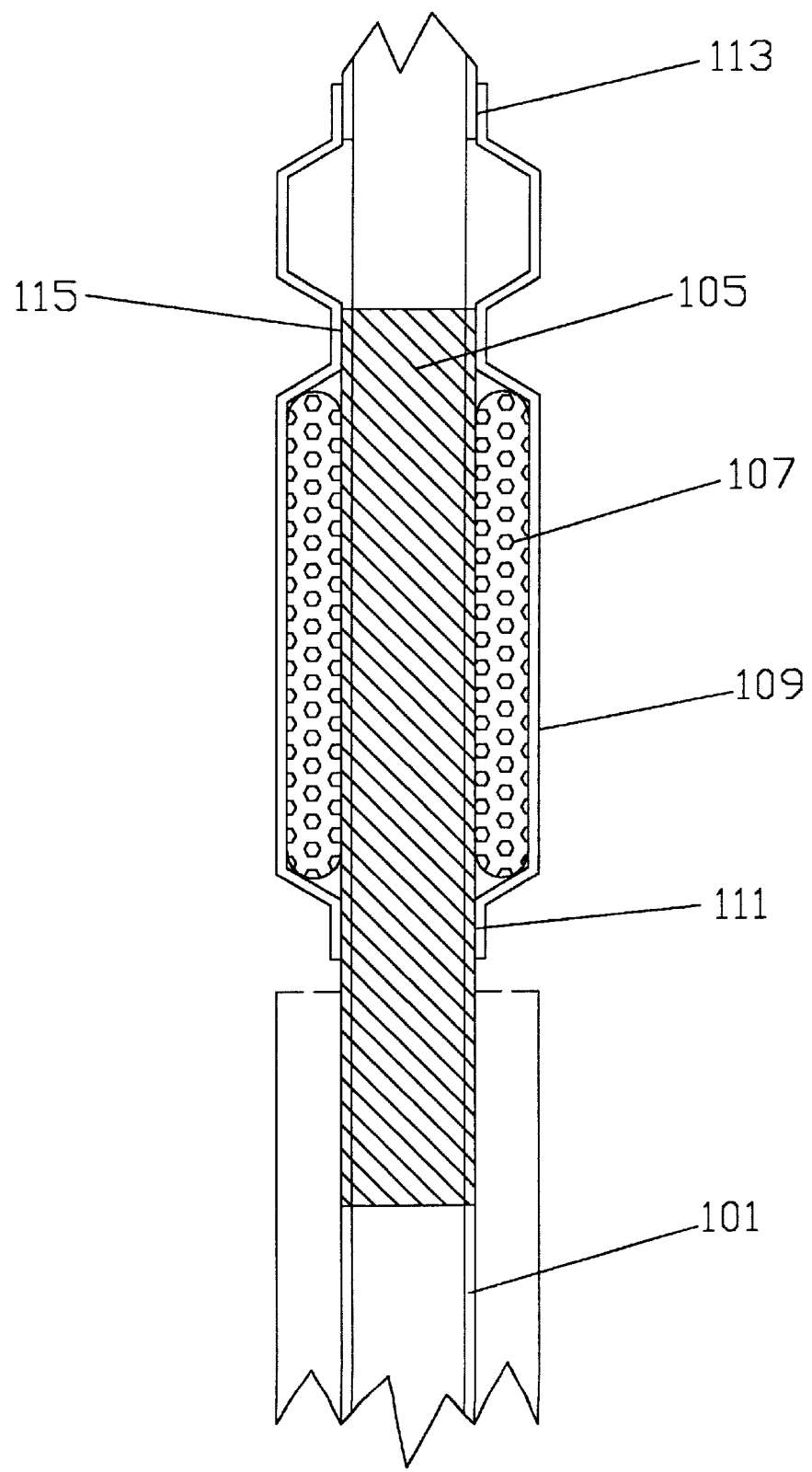
FIG. 15 is an enlarged view of a single cell of the tape taken along the lines 15—15 of FIG. 14.

The electrolyte reservoir blister 93 in each tape section 31 is more clearly shown in FIG. 15 comprising a blister film 109 of a nonporous material surrounding a non-conductive preferably plastic substrate 105. The plastic substrate 105 is composed of a non-reactive material and the blister film 109 is sealed to the plastic film 101 around its perimeter at its opposite ends 111 and 115 respectively. The electrolyte reservoir blister 93 contains a fluid electrolyte preferably an aqueous electrolyte to activate a tape section 31. This occurs by breaking open the sealed end 115 adjacent to the plenum chamber 91 so as to cause electrolyte from the reservoir blister 93 to flow from the plenum chamber 91 into the electrode segment 92 of the tape section 31 via the porous absorbent material 103. The electrolyte sealed in the reservoir blister 93 is preferably stored in an open cell porous foam member 107. The porous foam member 107 has a predetermined number of open size pores i.e. void volume for storing a precise volume of electrolyte. For a given blister volume the foam density may be varied to limit the maximum volume of the electrolyte relative to the size of the electrolyte blister reservoir 93.

The composition of the electrolyte will necessarily be selected based upon the selection of the anode and cathode as is well known to those skilled in the art. The film 109 for the electrolyte blister reservoir 93 may be composed of any plastic composition such as polyethylene, polypropylene or other plastic stable to the selected electrolyte or may, in fact be of a metal composition particularly if a gaseous electrolyte is used. The substrate 105 must be leakproof to contain the electrolyte within the reservoir blister 93 and may be composed of a solid leakproof material or from densified lamination or from layers impregnated with wax or another medium to render it nonporous and leakproof.

The sealed end 115 of the electrolyte reservoir blister 93 lies adjacent to the plenum 91 which may comprise an open space 94 into which electrolyte flows upon breaking open the sealed end 115. The porous absorbent material 103 may also extend into the plenum 91 to facilitate absorption of electrolyte upon breaking open the sealed end 115. The plenum 91 may be sealed at its opposite end 113 to the film 101.

The perimeter seal 115 is designed to open upon the application of predetermined pressure so that electrolyte flows only through the opened seal into the plenum chamber 91. This may be automated by advancing the tape 22 between the nip rolls 81 and 83. In general the seal 115 should have limited strength of between 50–75% of the strength of the blister film 109.

Figure 16A:
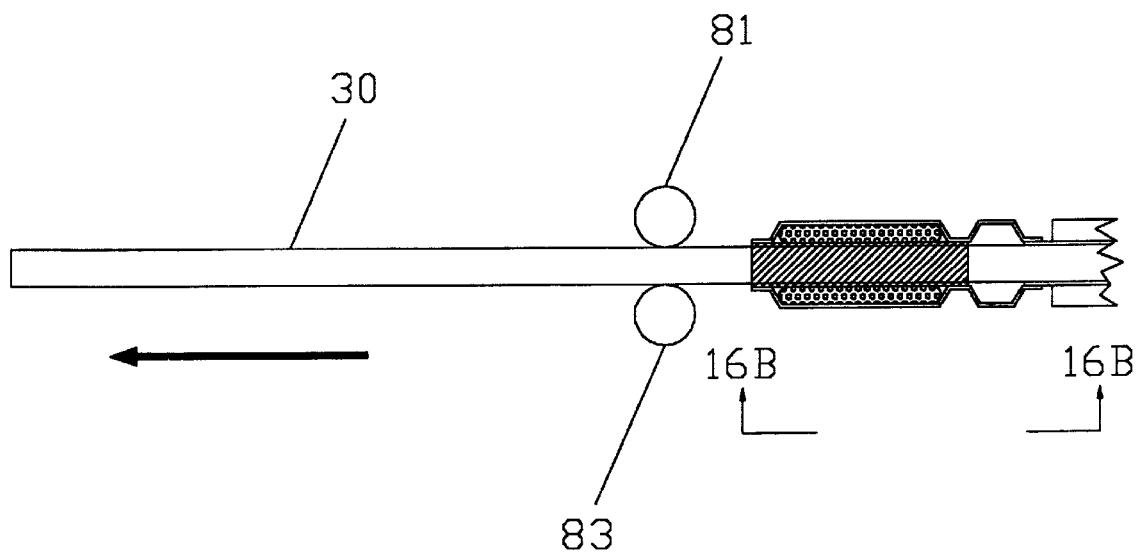
FIG. 16A shows the tape being advanced through rollers preceding activation of the first cell of the tape of FIG. 15.
Figure 16B:
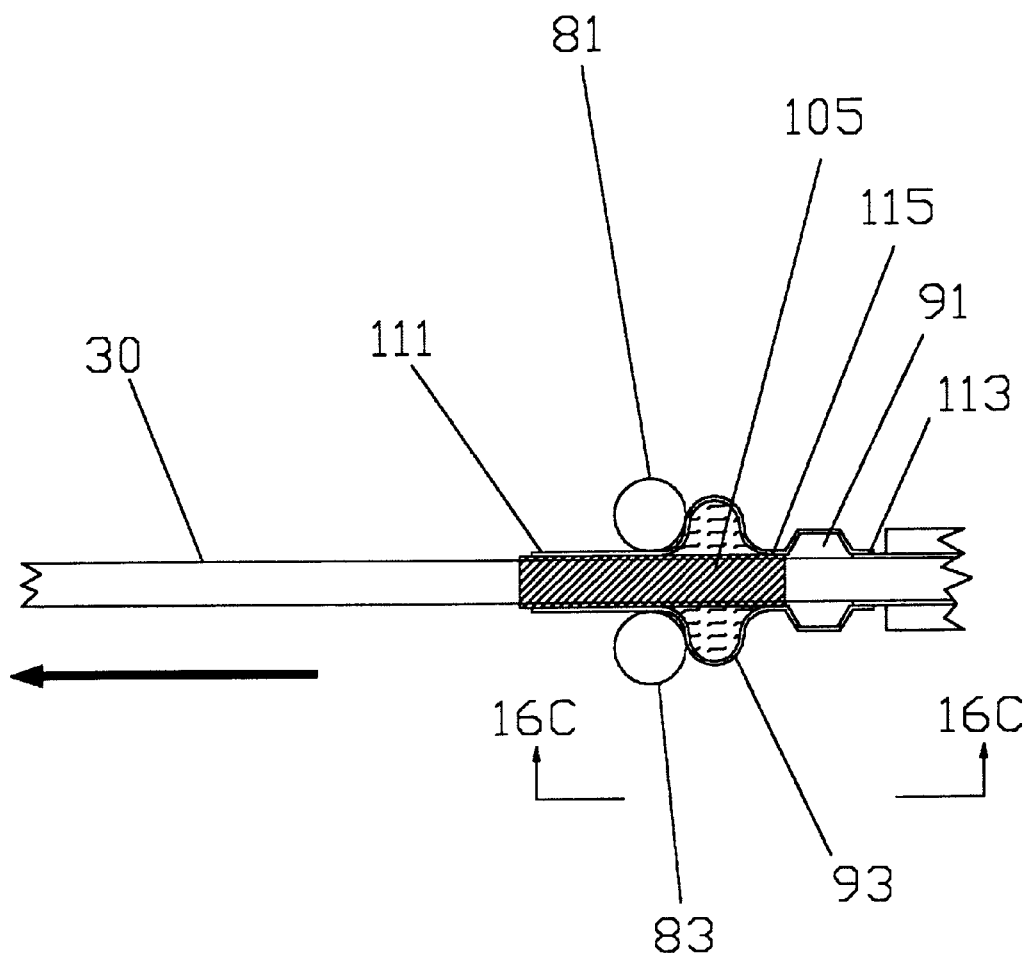
FIG. 16B shows the section of tape taken along the lines 16B—16B of FIG. 16A as the tape cell of FIG. 15 is advancing past the rollers.
Figure 16C:
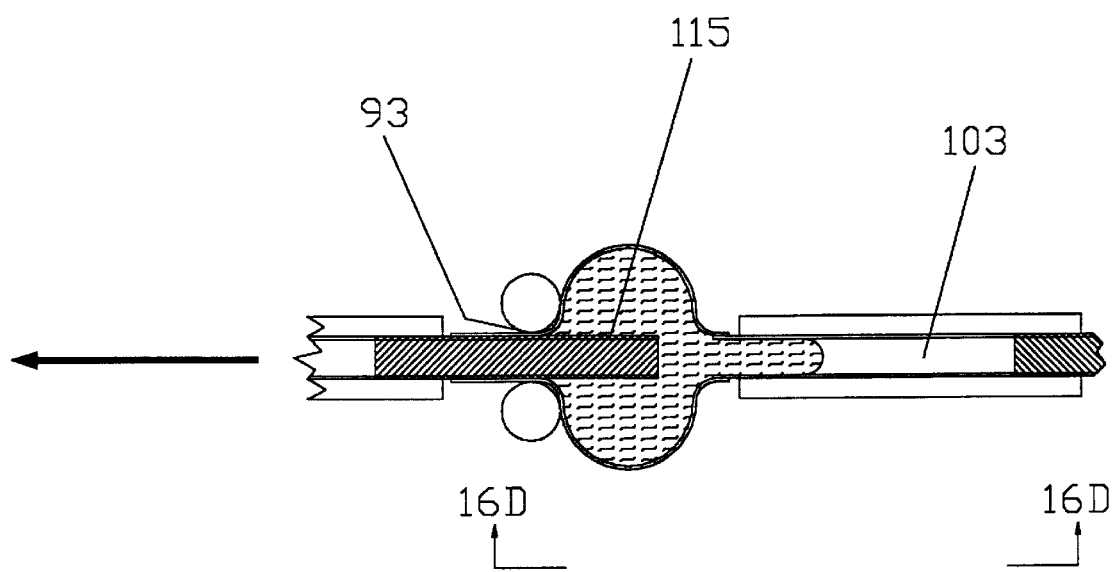
FIG. 16C shows the section of tape taken along the lines 16C—16C of FIG. 16B at the inception of activation of the tape cell of FIG. 15.
Figure 16D:
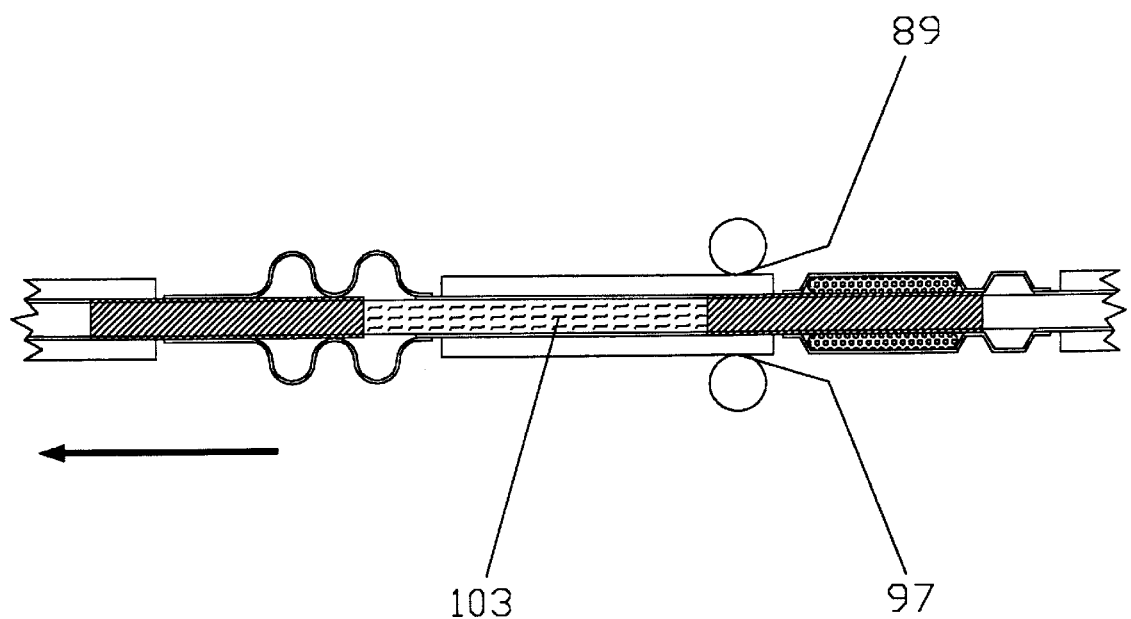
FIG. 16D shows the section of tape taken along the lines 16D—16D of FIG. 16C following activation of the tape cell of FIG. 15.

FIGS. 16A, 16B, 16C and 16D are section views of the tape 22 and nip rolls 81 and 83 showing how each section 31 of the tape 22 is individually activated. FIG. 16A shows the tape leader 30 as it emerges from the nip rolls 81 and 83 just prior to activation of the first tape section 31. The arrow indicates the direction of travel of the tape 22. FIG. 16B demonstrates how, as the electrolyte reservoir blister 93 passes between the nip rolls 81 and 83 pressure begins to build up. As shown in FIG. 16C, the pressure generated by the nip rolls force open the seal 115 between the electrolyte blister 93 and the downstream plenum 91 of the section of tape 31. This in turn causes the electrolyte to flow into the plenum 91. The plenum 91 takes up the shock of the burst of fluid and acts to distribute the electrolyte evenly across the width of the porous nonwoven separator 103. FIG. 16D shows the advanced tape section with the nip rolls in place on the electrical contact areas 89 and 97 of the cathode and anode respectively. With the porous nonwoven separator 103 fully saturated and the nip rolls in place on the electrical contact areas, the battery cell is activated allowing electrons to flow between the cathode and anode.

Figure 17:
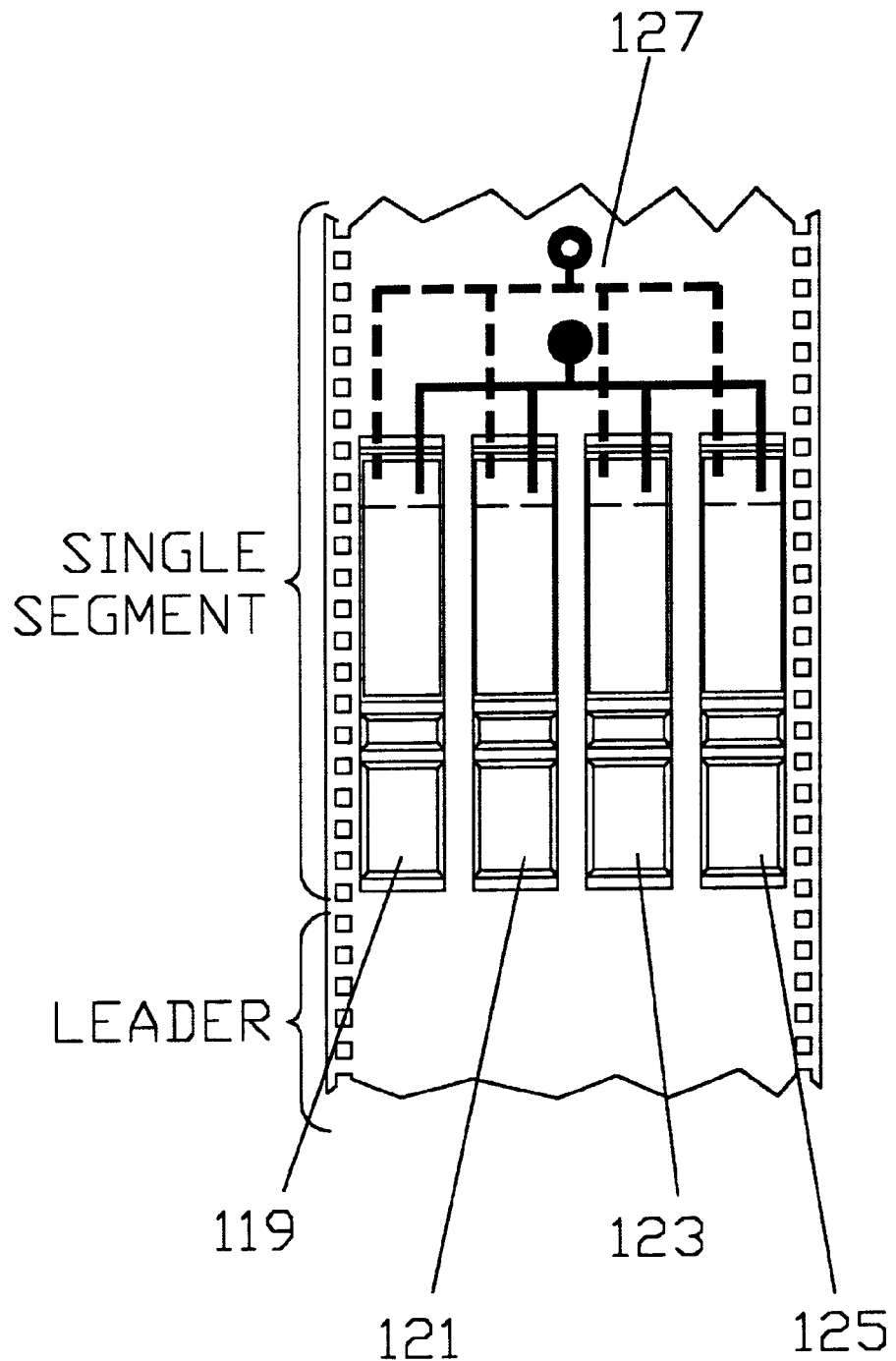
FIG. 17 shows a section of tape containing four segments of one tape section connected in series.
Figure 18:
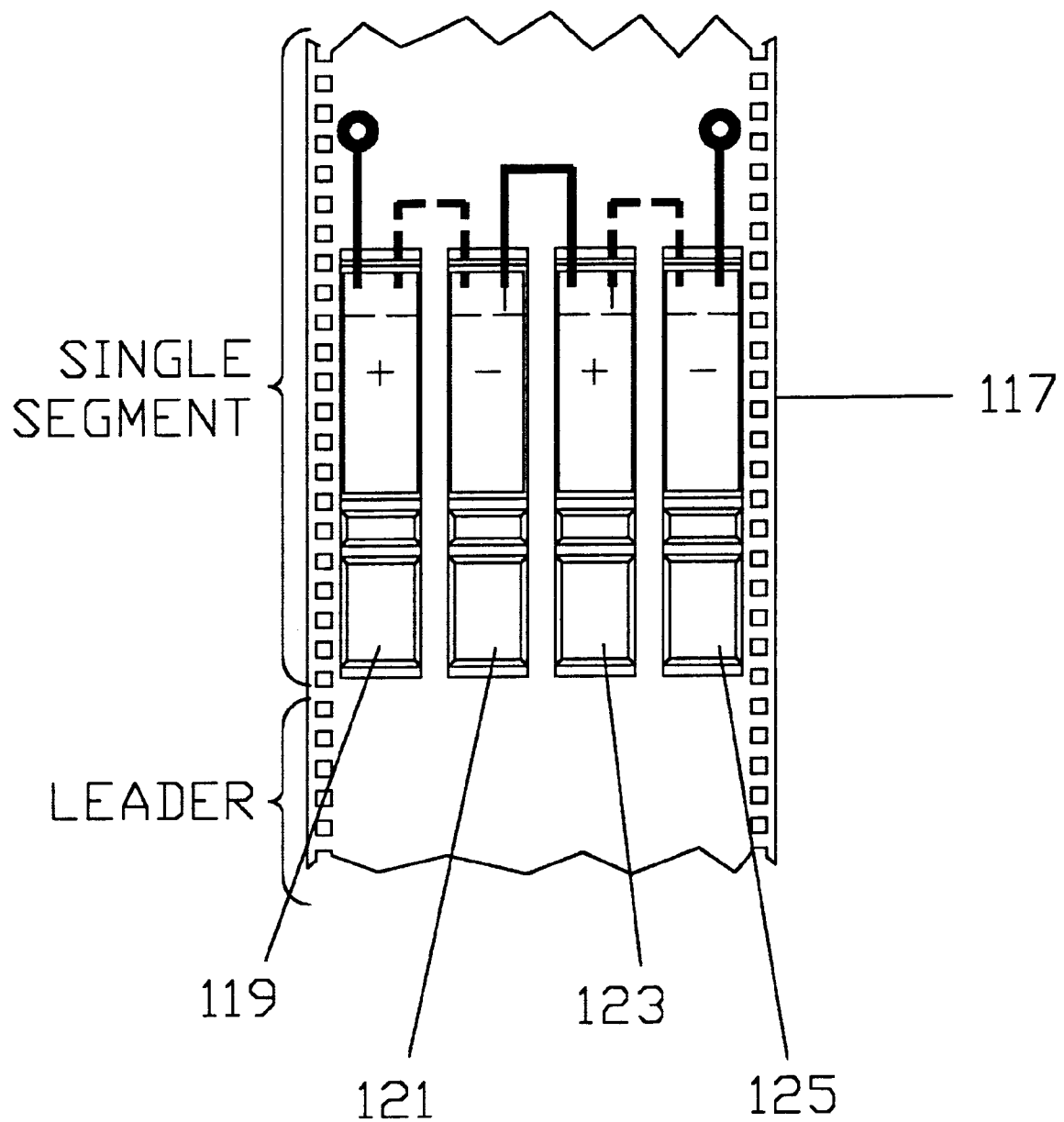
FIG. 18 shows the same arrangement as shown in FIG. 17 with the segments connected in series.
Figure 19:
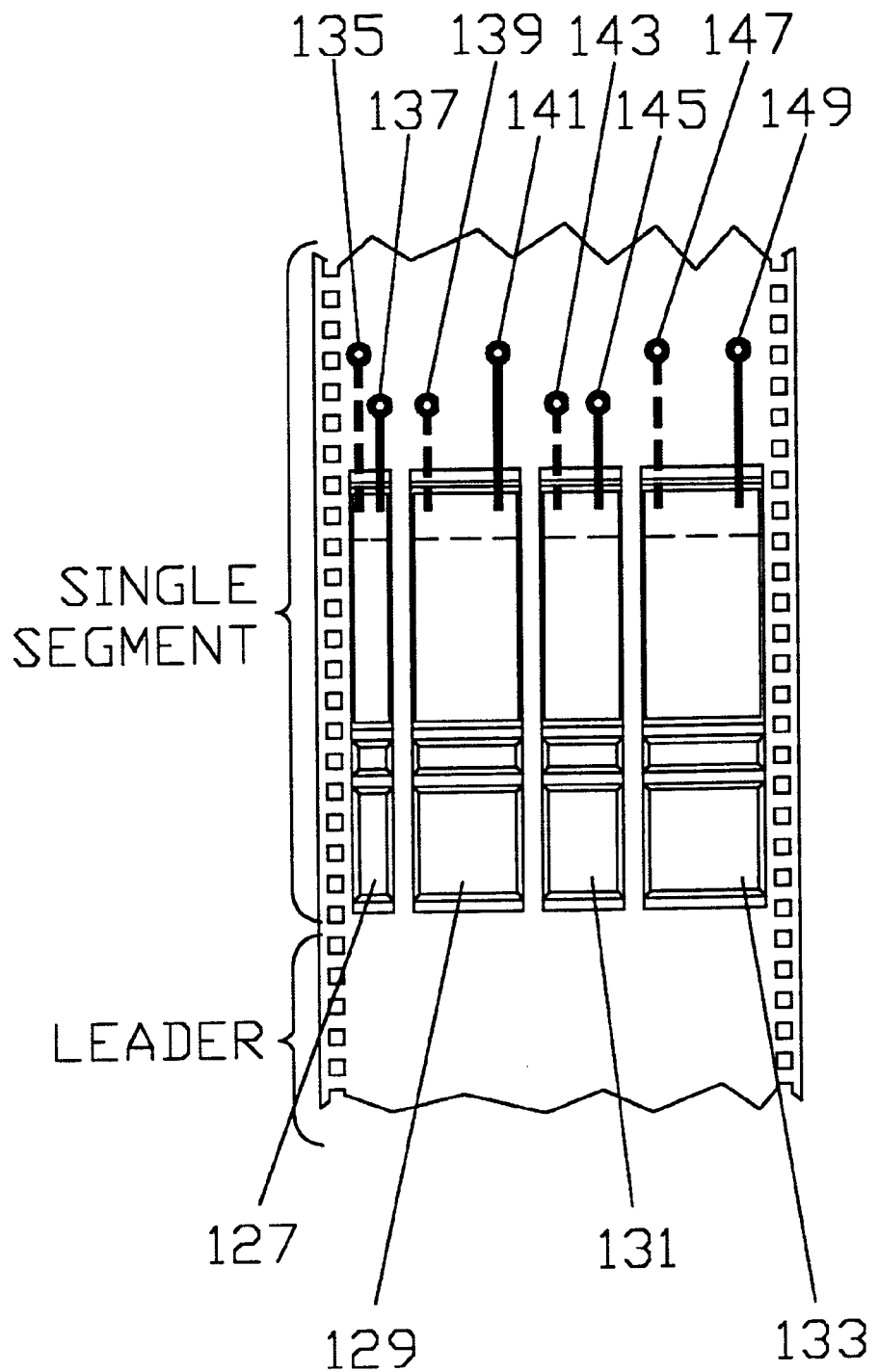
FIG. 19 shows a section similar to FIG. 17 and 18 with each of the four segments of different sizes.

Another variation of the embodiment of FIGS. 12–16 of the subject invention is shown in FIG. 17–19 inclusive with the tape 22 composed of a multiplicity of single sections 117. Each of the single sections 117 is divided into a plurality of segments 119, 121, 123, and 125 forming a given number of battery cells for each section of tape 117. The battery cells 119, 121, 123 and 125 are shown connected together in an electrical parallel arrangement by means of printed circuit wiring 127 to form a parallel four cell battery cell 117. The same arrangement in series is shown in FIG. 18. Obviously, the width of the tape 22 will determine how many equal size segments may be formed. In series the four cell battery section 117 of FIG. 18 will provide a 12 volt output assuming that each of the cells were formed using conventional alkaline chemistry. The current capacity for the section 117 is determined by the tape cell width and its length with the anode and cathode thickness controlling duration. If ten identical sections 117 were activated for use simultaneously it would represent a 120 volt battery source. Another arrangement is shown in FIG. 19 wherein the individual segments 127, 129, 131 and 133 are of different widths (lengths may also be varied) to provide different cell outputs for each segment respectively or they may be combined to provide more flexibility in designing the section for a given application. Even the thickness of the individual cells may be varied to provide even further control. In the embodiment of the invention represented by FIGS. 17 through 19 the tape 22 need not be wound around a spool but may instead be a roll of tape to be dispensed manually or in conjunction with the advancement of a specific medium.

What is claimed:

1. A tape cell battery system comprising an elongated strip of flexible tape composed of a plurality of discrete sections with each section of tape including an anode, a cathode, a fluid electrolyte and means for storing said electrolyte so that it is isolated from said anode and said cathode and with said system further comprising means for accessing said electrolyte in each section to enable each section to become electrochemically active while the other sections remain electrochemically dormant and means for advancing said tape in succession as each preceding section is electrochemically discharged with said elongated strip of flexible tape being interconnected to a strip of inactive material which functions as a leader in establishing a sequence for initially activating a section of said tape wherein said strip of flexible tape is interconnected to itself and to said strip of inactive material to form of an endless loop.

2. A tape cell battery system as defined in claim 1 wherein said means for accessing said electrolyte comprises a compartment sealed with electrolyte stored therein.

3. A tape cell battery system as defined in claim 2 wherein said sealed compartment comprises a reservoir blister.

4. A tape cell battery system as defined in claim 3 wherein each reservoir blister further comprises a porous foam element for storing a given volume of electrolyte.

5. A tape cell battery system as defined in claim 2 wherein each section of tape further comprising a segment containing a plenum chamber disposed adjacent to said anode and cathode.

6. A tape cell battery system as defined in claim 5 further comprising a supply reel having a rotatable core upon which said strip of tape is wound in a cylindrical configuration with an inner winding of said tape contiguous to said core extending outwardly from said core and connected back to said tape as the outer winding of said endless loop and with said tape extending from said inner winding to said outer winding.

7. A tape cell battery system as defined in claim 2 further comprising means through which said flexible tape is advanced for opening each sealed electroltye compartment in each section independent of one another.

8. A tape cell battery system as defined in claim 7 wherein said means comprises nip rolls.

9. A tape cell battery system as defined in claim 7 wherein each section of tape further comprises a porous separating material disposed between said anode and said cathode.

10. A tape cell battery system as defined in claim 9 wherein each electrolyte blister in each section of tape surrounds a dense nonporous material to form a section of tape which extends in an adjacent relationship to a segment of said tape containing said porous separating material for forming a discrete battery cell.

11. A tape cell battery system as defined in claim 1 wherein each section of tape comprises a plurality of said discrete battery cells.

12. A tape cell battery system as defined in claim 11 further comprising means for electrically connecting said plurality of discreet battery cells in series or in parallel.

13. A tape cell battery system as defined in claim 12 wherein said plurality of discreet battery cells are of different sizes.

14. A tape cell battery system comprising a single compartment housing an elongated strip of flexible tape interconnected as an endless loop, means for separating said tape into segmented sections containing an anode, a cathode and fluid electrolyte and means for forming a weak seal of predefined strength between each segment containing said fluid electrolyte and an adjacent segment containing an anode and cathode so as to form a plurality of electrochemically dormant battery cells and means for individually opening each weak seal in each battery such that only one battery cell at a time becomes electrochemically active while the other battery cells remain electrochemically dormant.

15. A tape cell battery system as defined in claim 14 wherein said means for individually opening each sealed segment comprises nip rolls through which said flexible tape is advanced.

16. A tape cell battery system as defined in claim 15 further comprising control means for advancing said flexible tape through said nip rolls so as to vary the time of dormancy between the activation of each battery cell.

17. A tape cell battery system comprising an elongated strip of flexible tape composed of a plurality of segmented sections with each segmented section of tape consisting of a plurality of discrete battery cells with each cell having an anode and a cathode and wherein each section of tape contains fluid electrolyte to electrochemically activate the anode and cathode in each of the battery cells and with said system further comprising means for electrically connecting said plurality of discrete battery cells in each section in a series and/or parallel arrangement, means for advancing said tape in succession and a strip of inactive material connected to said strip of tape and functioning as a leader for establishing a sequence for advancing each section of tape in said tape battery cell system wherein said strip of flexible tape is interconnected to itself and said strip of inactive material in the form of an endless loop.

\* \* \* \* \*